US005752200A

United States Patent [19]

Meredith et al.

[11] Patent Number: 5,752,200

[45] Date of Patent: May 12, 1998

[54] MODULAR INTERCONNECT MATRIX FOR MATRIX CONNECTION OF A PLURALITY OF ANTENNAS WITH A PLURALITY OF RADIO CHANNEL UNITS

[75] Inventors: Sheldon Kent Meredith; Walter Brian Steele, both of Phoenix, Ariz.

[73] Assignee: Radio Frequency Systems, Inc., Marlboro, N.J.

[21] Appl. No.: 806,132

[22] Filed: Feb. 13, 1997

Related U.S. Application Data

[63] Continuation of Ser. No. 348,045, Dec. 1, 1994, Pat. No. 5,701,596.

[51] Int. Cl.[6] .............................. H04B 1/38; H04M 1/00

[52] U.S. Cl. ........................ 455/562; 455/103; 455/277.1

[58] Field of Search ................................ 455/9, 73, 422, 455/67.1, 561, 562, 524, 101, 103, 115, 129, 132–135, 161.1–161.3, 164.1, 272, 277.1–277.2; 333/100, 101; 342/371, 372, 373, 374

[56] References Cited

U.S. PATENT DOCUMENTS

| | | | |
|---|---|---|---|
| 3,710,281 | 1/1973 | Thomas | 333/6 |
| 3,731,217 | 5/1973 | Gerst et al. | 330/56 |
| 3,783,385 | 1/1974 | Dunn et al. | 325/305 |
| 3,964,065 | 6/1976 | Roberts | 343/100 |
| 4,091,387 | 5/1978 | Profera | 343/754 |
| 4,163,974 | 8/1979 | Profera et al. | 343/16 |
| 4,165,497 | 8/1979 | Irons | 333/101 |
| 4,317,229 | 2/1982 | Craig et al. | 455/277 |
| 4,603,408 | 7/1986 | Singhal et al. | 367/92 |
| 4,647,868 | 3/1987 | Mueller | 330/286 |
| 4,694,484 | 9/1987 | Atkinson et al. | 379/59 |
| 4,704,734 | 11/1987 | Menich et al. | 455/33 |
| 4,728,956 | 3/1988 | Wallington | 342/371 |
| 4,761,822 | 8/1988 | Maile | 455/82 |
| 4,774,481 | 9/1988 | Edwards et al. | 333/127 |
| 4,785,267 | 11/1988 | Covill | 333/125 |
| 4,814,730 | 3/1989 | Via et al. | 333/119 |
| 4,835,496 | 5/1989 | Schellenberg et al. | 333/128 |
| 4,932,049 | 6/1990 | Lee | 379/60 |

(List continued on next page.)

FOREIGN PATENT DOCUMENTS

| | | |
|---|---|---|
| 0352787 | 1/1990 | European Pat. Off. . |
| 0364190 | 4/1990 | European Pat. Off. . |
| 0593822 | 4/1994 | European Pat. Off. . |
| 0639035 | 2/1995 | European Pat. Off. . |
| 9107019 | 5/1991 | WIPO . |
| 9312590 | 6/1993 | WIPO . |
| 9623329 | 1/1996 | WIPO . |

OTHER PUBLICATIONS

The Performance Enhancement of Multibeam Adaptive Base–Station Antennas for Cellular Land Mobile Radio Systems: Swales et al. IEE Transactions on Vehicular Technology, vol. 39, No. 1, Feb. 1990.

*Primary Examiner*—Nguyen Vo
*Attorney, Agent, or Firm*—Ware, Fressola, Van Der Sluys & Adolphson LLP

[57] ABSTRACT

A modular interconnect matrix (200) interconnects a plurality (M) of radio channel units (203) with a plurality (N) of antennas (202). Each radio channel unit (203) is connected to a first connector (222) on a corresponding first switching module (217) having a plurality (N) of seconds connectors (225). Each antenna (202) is connected to a first connector (212) of a corresponding antenna interface module (205) having a plurality (X) of second connectors (215). The second connectors (215,225) on the modules (205,217) are arranged for interconnection of at least one second connector (225) on each of the first switching modules (217) with at least one second connector (215) on each of the antenna interface modules (205). Each of the first switching modules (217) provides for the connection of the first switching module first connector (222) with any one of its second connectors (225) under control of a switch control portion of the matrix (240, 260, 263, 267), thereby allowing each radio channel unit (203) to be interconnected to any one of the antennas (202).

18 Claims, 9 Drawing Sheets

U.S. PATENT DOCUMENTS

| | | | |
|---|---|---|---|
| 5,032,804 | 7/1991 | Hollingsworth | 333/132 |
| 5,067,147 | 11/1991 | Lee | 379/60 |
| 5,070,304 | 12/1991 | Salib et al. | 330/54 |
| 5,111,166 | 5/1992 | Plonka et al. | 333/128 |
| 5,162,804 | 11/1992 | Uyeda | 342/373 |
| 5,175,878 | 12/1992 | Davis et al. | 455/103 |
| 5,187,447 | 2/1993 | Tsai | 330/124 |
| 5,193,109 | 3/1993 | Lee | 379/60 |
| 5,214,394 | 5/1993 | Wong | 330/286 |
| 5,222,246 | 6/1993 | Wolkstein | 455/13.4 |
| 5,243,598 | 9/1993 | Lee | 370/95.3 |
| 5,302,914 | 4/1994 | Arntz et al. | 330/129 |
| 5,303,240 | 4/1994 | Borras et al. | 370/95.3 |
| 5,304,943 | 4/1994 | Koontz | 330/51 |
| 5,313,174 | 5/1994 | Edwards | 333/109 |

MODULAR INTERCONNECT MATRIX FOR MATRIX CONNECTION OF A PLURALITY OF ANTENNAS WITH A PLURALITY OF RADIO CHANNEL UNITS

This is a continuation of application Ser. No. 08/348,045 filed on Dec. 1, 1994, U.S. Pat. No. 5,701,596.

TECHNICAL FIELD

The present invention relates to the interconnection of radios with antennas, and more particularly, to a modular interconnect matrix for the matrix connection of any one of a plurality of radios with any one of a plurality of antennas.

BACKGROUND OF THE INVENTION

In a land mobile radio base site, a number of antennas are typically used to transmit and receive RF signals for a plurality of radio channel units (radios). In such known systems, each radio channel unit comprises a transmitter section for the generation and transmission of RF signals at the operating frequency of the radio channel unit and a receiver section for receiving RF signals at the operating frequency of the radio channel unit.

For the transmission of RF signal, each antenna is connected to one or more of the radio channel units for transmitting signals provided by the transmitter section of the corresponding radio channel units. If more than one radio channel unit is designated to transmit RF signals via a single antenna, the RF signals provided by the radio channel units are combined in a combiner, and the combined RF signals are provided by the combiner to the antenna for transmission thereof.

For the receipt of RF signals, each antenna is connected to one or more of the radio channel units for providing received RF signals to the receiver section of the radio channel units. If the antenna is designated to provide received RF signals to more than one radio channel unit, the output of the antenna is connected to a splitter which splits the received RF signal from the associated antenna into a plurality of equal power parts. The parts of the received RF signal are then provided to the associated radio channel units. If the radio channel unit comprises a diversity receiver, e.g., a receiver having two inputs and capable of selecting the strongest RF signal between the two RF signals for demodulation, then the radio channel unit is connected to two antennas.

In the above described land mobile radio base site, each radio channel units is directly connected to one or two dedicated antennas for the transmission and receipt of RF signals. Therefore, the antennas used must have generally omni-directional characteristics to ensure the proper receipt of RF signals from, and the transmission of RF signals to, mobile radios (mobile subscribers).

It is generally known that improved transmission and receipt of RF signals between a radio channel unit at a mobile radio base site and a mobile subscriber may be achieved using an array of directional antennas at the mobile radio base site. However, in such a mobile radio base site having a large number of radio channel units, e.g., 60 radio channel units, and a large number of directional antennas, e.g., 16 directional antennas, a significant problem exists with respect to interconnecting the transmitter section and receiver section of the radio channel units to the directional antennas for optimal transmission and receipt of RF signals, respectively.

SUMMARY OF THE INVENTION

Objects of the invention include a modular interconnect matrix for matrix connection of any one of a plurality of radio channel units with any one of a plurality of antennas.

Another object of the present invention is to provide a modular interconnect matrix having a plurality of modules which may be quickly assembled for matrix connection of a plurality (N) of antennas with a plurality (M) of radio channel units.

A further object of the present invention is to provide a modular interconnect matrix with modules having coaxial quick-disconnect connectors for matrix connection of a plurality (N) of antennas with a plurality (M) of radio channel units.

Another object of the present invention is to provide a modular interconnect matrix having a plurality of modules which are easy and economical to manufacture, and which provide for easy assembly for the matrix connection of a plurality (M) of radio channel units with a plurality (N) of antennas.

A still further object of the present invention is to provide a modular interconnect matrix for dynamically connecting a receive terminal of each one of a plurality of radio channel units with any one of a plurality of antennas which, on average during a sampling period, has the strongest received signal strength of RF signals at the operating frequency of the one radio channel unit.

Another object of the present invention is to provide a modular interconnect matrix for dynamically interconnecting a transmit terminal of each one of a plurality of radio channel units with any one of a plurality of antennas which, on average during a sampling period, is best suited for transmitting RF signals at the operating frequency of the one radio channel unit in a direction corresponding to the desired destination for the transmitted RF signals.

According to the present invention, a modular interconnect matrix interconnects a plurality (M) of radio channel units with a plurality (N) of antennas; each radio channel unit is connected to a first connector on a corresponding first switching module having a plurality (N) of seconds connectors, and each antenna is connected to a first connector of a corresponding antenna interface module having a plurality (X) of second connectors; the second connectors on the first switching modules are configured for interconnection with the second connectors on the antenna interface modules and the second connectors on the modules are arranged for interconnection of at least one second connector on each of the first switching modules with at least one second connector on each of the antenna interface modules; each of the first switching modules provides for the connection of the first connector with any one of the second connectors, thereby allowing each radio channel unit to be interconnected to any one of the antennas.

In further accord with the present invention, a switch control is provided which controls the interconnection of the first connector to any one of the second connectors on the first switching modules.

According further to the present invention, a pair of modular interconnect matrices are provided including a radio signal transmit modular interconnect matrix for interconnecting a transmit terminal of each one of the radio channel units with any one of the antennas for the transmission of RF signals, and a radio signal receive modular interconnect matrix for interconnecting a receive terminal of each one of the radio channel units with any one of the antennas for providing RF signals received by the antennas to the corresponding radio channel units.

According still further to the present invention, in the radio signal receive modular interconnect matrix, the first connector on each first switching module is connected to a receive connector on the corresponding radio channel unit, and each antenna interface module is a splitter which divides a signal received from the corresponding antenna into a plurality (X) of divided signals each having an equal signal strength which is a fraction (1/X) of the received signal strength.

In still further accord with the present invention, the switch control comprises a plurality (Y) of second switching modules having a plurality (N) of second connectors and a first connector connected to a scanning receiver, each scanning receiver being associated with corresponding ones of the radio channel units; the second connectors on the second switching modules are configured for interconnection with the second connectors on the antenna interface modules and the second connectors on the modules are arranged for interconnection of at least one second connector on each second switching module with at least one second connector on each of the antenna interface modules. Each second switching module is configured for interconnecting each scanning receiver with any one of the antennas, and each scanning receiver provides output data signals to a micro-controller indicative of the received signal strength on each of the antennas at the operating frequencies of the corresponding ones of the radio channel units for determining the antenna having the strongest signal strength at the assigned frequency of the corresponding ones of the radio channel units, the micro-controller further providing control signals to the first switching modules for interconnecting each radio channel unit with the antenna indicated as having the strongest signal strength at the operating frequency of the radio channel unit.

According further to the present invention, in the radio signal transmit modular interconnect matrix, the first connector on each first switching module is connected to a transmit connector on the corresponding radio channel unit, and each antenna interface module is a combiner which combines RF signals provided on its second connectors from the radio channel units into a combined RF signal which is provided to a corresponding antenna via the antenna interface module second connector.

According further to the present invention, each radio channel unit has a diversity receiver capable of receiving signals from two antennas and determining the signal having the strongest signal strength, and each first switching module in a radio signal receive modular interconnect matrix is provided with two first connectors for interconnection with the two diversity receiver connectors of the corresponding radio channel unit diversity receiver, the micro-controller provides control signals to the first switching modules indicative of the two antennas having the stronger signal strength at the operating frequency for each of the associated radio channel units, and the first switching modules interconnect one of the first connectors with the antenna having the strongest signal strength and the other of the first-connectors with the antenna having the second strongest signal strength.

In still further accord with the present invention, the micro-controller controls each first switching module in the radio signal transmit modular interconnect matrix such that the first connector is interconnected with the antenna indicated as having the strongest signal strength when a signal is received for the corresponding radio channel unit in the radio signal receive modular interconnect matrix.

The-present invention provides a significant improvement over the prior art by providing a modular interconnect matrix between a plurality of radio channel units and a plurality of antennas. Such a modular interconnect matrix allows for the use of a plurality of directional antenna at a land mobile radio base site for improved transmission and receipt of RF signals. Additionally, the modular components which make up the matrix may be easily manufactured and tested, and therefore provide a simple and economical means of interconnecting radio channel units with antennas. The modular units of the modular interconnect matrix are easy to assemble, and provide a reliable connection between any one radio channel unit with any one antenna.

The foregoing and other objects, features and advantages of the present invention will become more apparent in light of the following detailed description of exemplary embodiments thereof, in view of the accompanying drawings.

BEST MODE FOR CARRYING OUT THE INVENTION

Figure 1A:
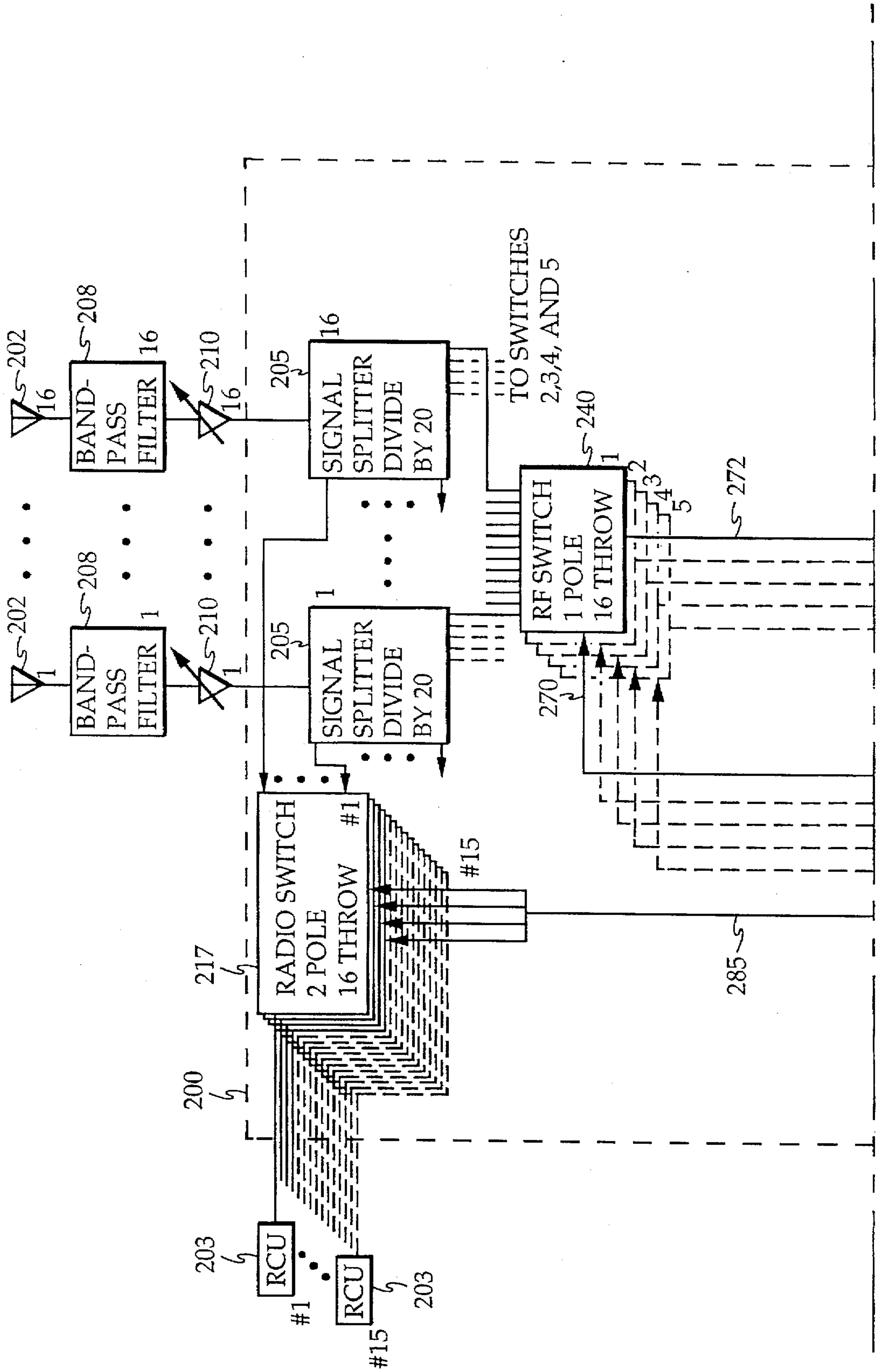
FIGS. 1A and 1B together are a schematic block diagram of the modular interconnect matrix of the present invention.
Figure 1B:
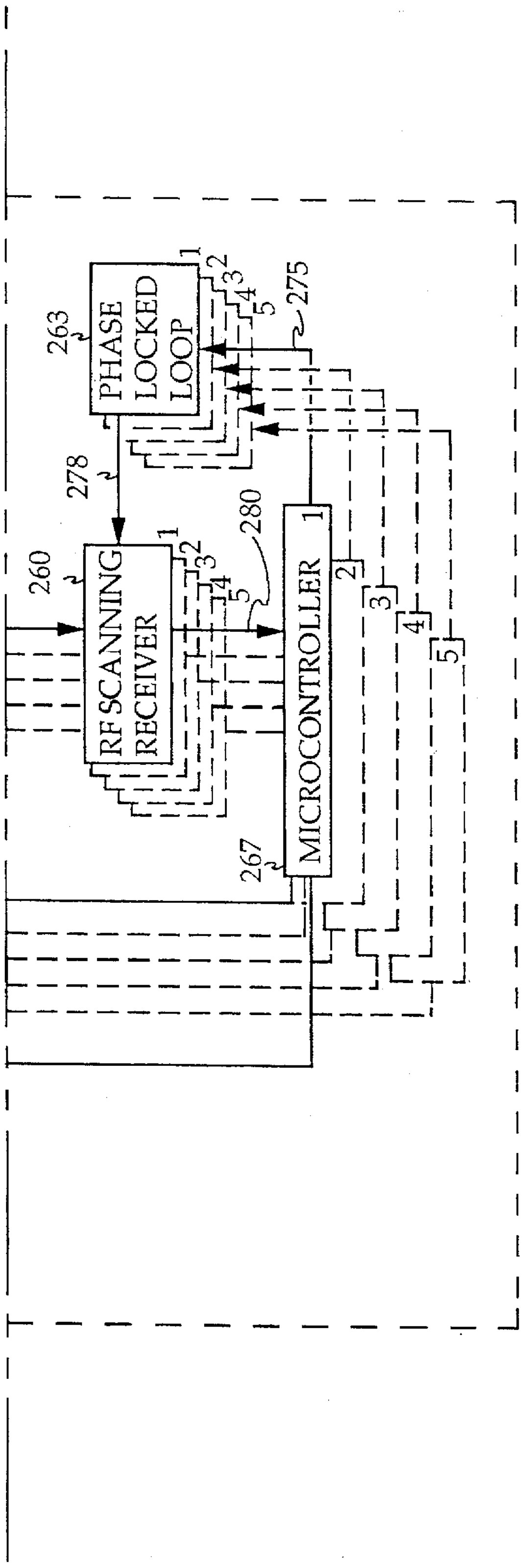
Figure 1:
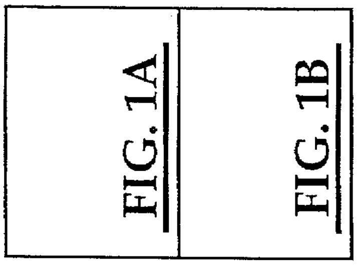
FIG. 1 shows the relation between FIGS. 1A and 1B.

Referring to FIGS. 1A and 1B, the modular interconnect matrix 200 is used to interconnect a plurality (N) of antennas 202 to a plurality (M) of a radio channel units 203. FIGS. 1A and 1B are an example of a radio signal receive modular interconnect matrix, e.g., a modular interconnect matrix which is used to provide signals received on antennas 202 to receive terminals mounted on the radio channel units 203. Although the invention is described and illustrated in FIGS. 1A and 1B with respect to the receipt of signals by the radio channel units, the invention is equally applicable to the transmission of RF signals provided by the radio channel units, as will be described in greater detail hereinafter.

Figure 2:
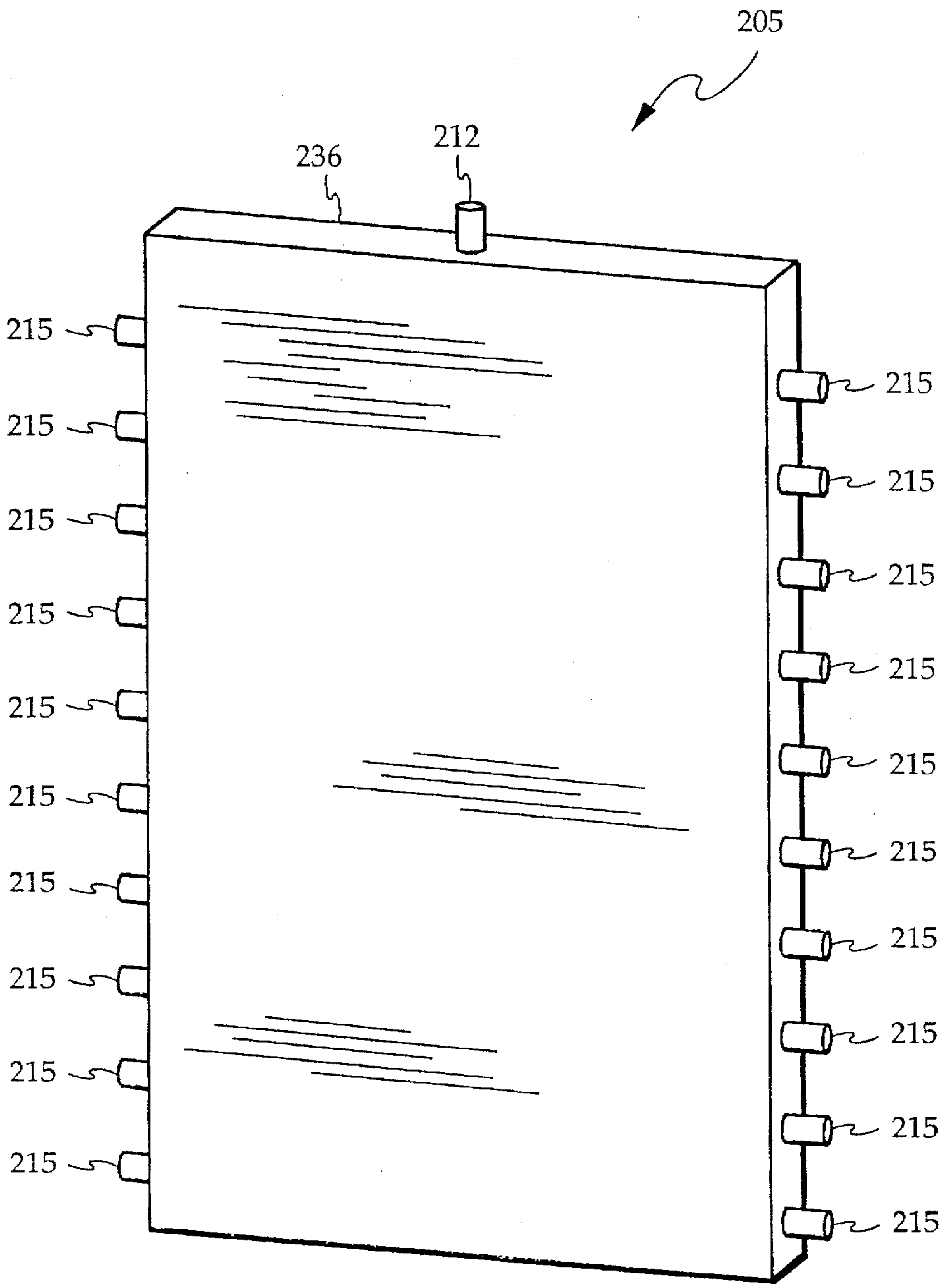
FIG. 2 is a perspective view of a splitter/combiner module of the modular interconnect matrix of FIG. 1.

The modular interconnect matrix 200 comprises a plurality (N) of signal splitter modules 205, one signal splitter module 205 being associated with each of the antennas 202. Each antenna 202 is connected to its associated signal splitter modules 205 via a band pass filter 208 and an adjustable preamplifier 210 which amplifies the received signals before being provided to the signal splitters 205. In FIGS. 1A and 1B, sixteen (16) antennas 202 are shown interconnected to sixteen (16) signal splitter modules 205. The signal splitter modules 205 are power dividers which divide the amplified RF signals into a plurality (X) of equal parts, e.g., each of the equal parts has an identical signal characteristic (shape) as the amplified RF signal at a fraction (1/X) of the signal strength. For example, a 20-way power divider having a frequency range of 824 to 894 MHZ and an insertion loss of 16dB may be selected for use as a signal splitter. In FIG. 2, each signal splitter module 205 is illustrated as dividing the received RF signal into 20 equal parts.

Figure 3:
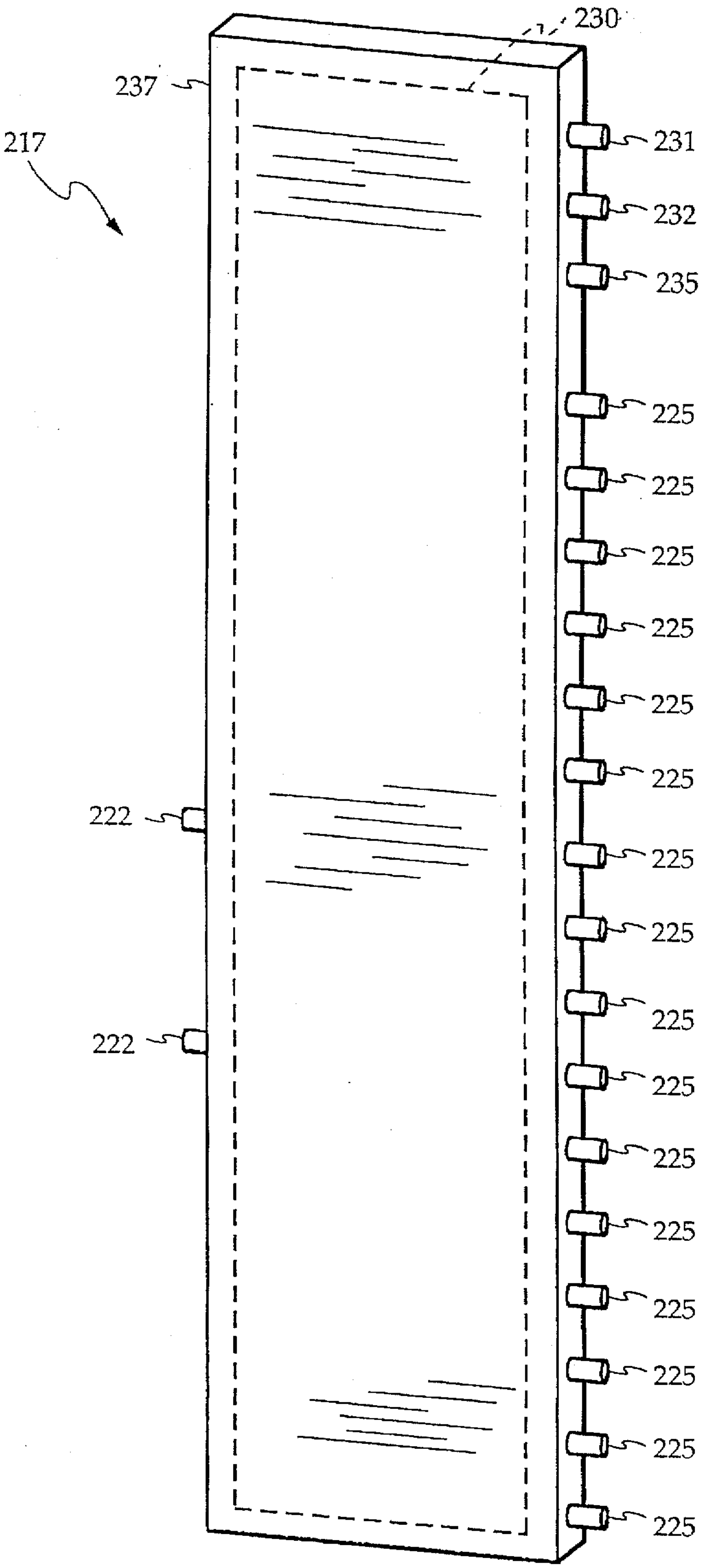
FIG. 3 is a perspective view of a first switching module of the modular interconnect matrix of FIGS. 1A and 1B.

Referring also to FIG. 2, the signal splitter module 205 comprises an input connector 212 where the amplified signals provided by the antenna are input to the signal splitter module 205. The signal splitter module 205 also comprises a plurality (X) of output connectors 215 where the equal parts of the amplified RF signals are provided. FIG. 3 illustrates the signal splitter module 205 having 20 output connectors.

Referring again to FIGS. 1A and 1B, the modular interconnect matrix 200 also comprises a plurality (M) of first switching modules (radio switching modules) 217. There is one first switching module 217 associated with each radio channel unit 203. Referring also to FIG. 3, each of the first switching modules 217 comprises a pair of first connectors 222 for interconnection with a pair of receiver connectors on the corresponding radio channel unit 203 (FIGS. 1A and 1B). Each first switching module 217 also comprises a plurality (N) of second connectors 225. Each of the first connectors 222 and second connectors 225 are connected to an electronic switch 230 located within the first switching module 217. The electronic switch 230 is also connected to a ground connector 231, a power supply connector 232 and a control connector 235 mounted on the first switching module 217. As will be described in greater detail hereinafter, the electronic switch 230 is a 2-pole-N-throw switch which operates under control of control signals provided to the control connector 235 for connecting each one of the first connectors 222 to one of the second connectors 225. The electronic switch 230 may be a two-pole-sixteen-throw electronic switch SW9481 manufactured by the Celwave Division of Radio Frequency Systems, Inc., which is powered by a 15 VDC power supply and is controlled by a pulse width modulated data stream containing both timing (clock) data and control (switching) data.

Referring now to FIGS. 1A, 1B, 2, 3 and 5, the second connectors 215, 225 on both the signal splitter modules 205 and the first switching modules 217 are configured and arranged such that each one of the second connectors 225 on the first switching modules 217 may be interconnected to one second connector 215 on each signal splitter module 205. It will therefore be understood by those skilled in the art that using the above described arrangement, each one of the first switching modules 217 is provided with a portion (1/X) of the RF signal output of each antenna 202 due to the matrix interconnection of the first switching modules 217 with the signal splitter modules 205.

Referring to FIG. 2, to achieve the above described matrix interconnection of the first switching modules 217 with the signal splitter module 205, the signal splitter module 205 comprises a housing 236 which is generally rectangular in shape with the first connector 212 mounted at the center of one of the shorter (minor axis) sides of the rectangle. The second connectors 215 of the signal splitter module 205 are divided into two groups and are equally spaced on opposite long (major axis) sides of the rectangular shaped housing. Both the first connector 212 and the second connectors 215 on the signal splitter module 205 are male coaxial quick disconnect connectors 238 of the type illustrated in FIG. 6.

Referring to FIG. 3, the first switching module 217 also comprises a generally rectangular shaped housing 237. The first connectors 222 are evenly spaced about a central point of one long (major axis) side of the first switching module housing 237. The second connectors 225 are positioned on the other long (major axis) side of the housing 237 with the ground connector 231, the power connector 232 and the control connector 235. All of the connectors on the first switching module 217 are female coaxial quick disconnect connectors 239 of the type illustrated in FIG. 7.

Figure 6:
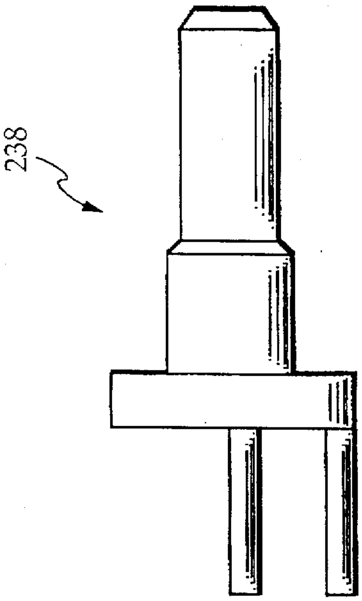
FIG. 6 is a side view of a coaxial quick-disconnect connector.
Figure 7:
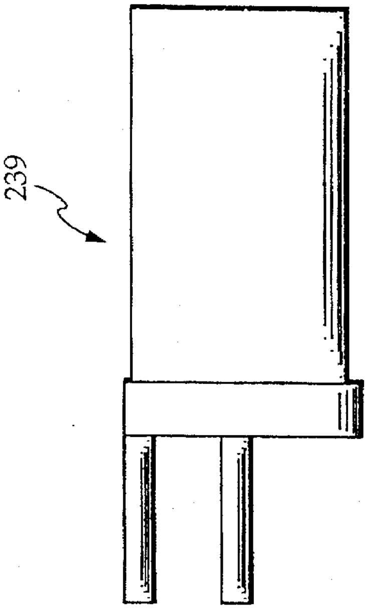
FIG. 7 is a side view of a coaxial quick-disconnect connector.

The male and female coaxial quick disconnect connectors 238, 239 illustrated in FIGS. 6 and 7 may be selected from known connectors which are designed for interconnection with one another for providing a connection therebetween. The dimensions of the connectors are selected such that when the male and female connectors are interconnected, there is sufficient friction therebetween to provide a strong and secure connection without the requirement of threads or other interlocking means.

Figure 5:
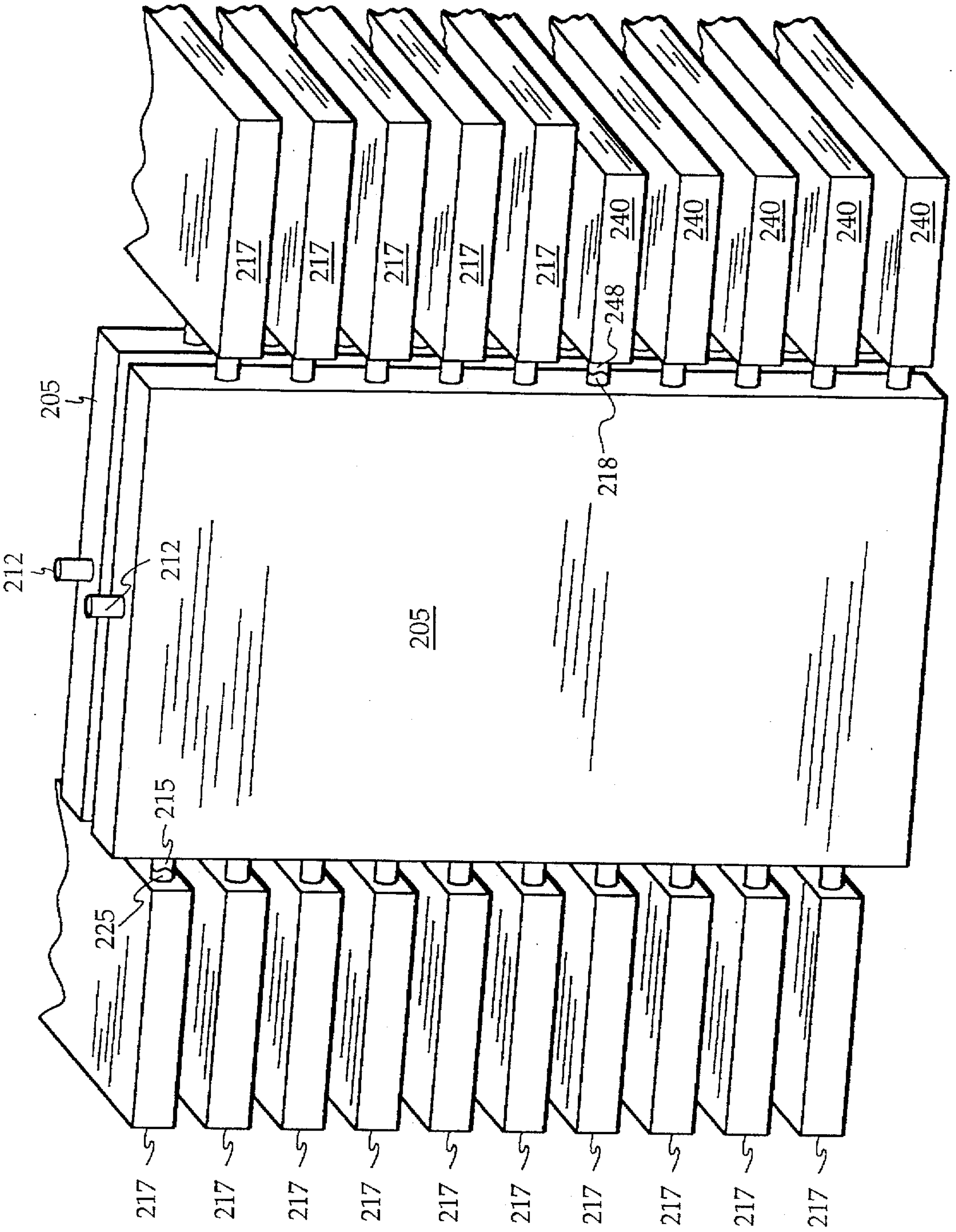
FIG. 5 is a perspective view of the modular interconnect matrix of FIGS. 1A and 1B.

Referring now to FIGS. 2, 3 and 5, the arrangement of the second connectors 225 on the first switching module 217 is selected such that when the signal splitter modules 205 are arranged adjacent to one another with the rows of second connectors 215 parallel to one another, the second connectors 225 of a first switching module 217 placed perpendicular to the parallel rows of second connectors 215 of the signal splitter module 205 will engage with one another.

Figure 4:
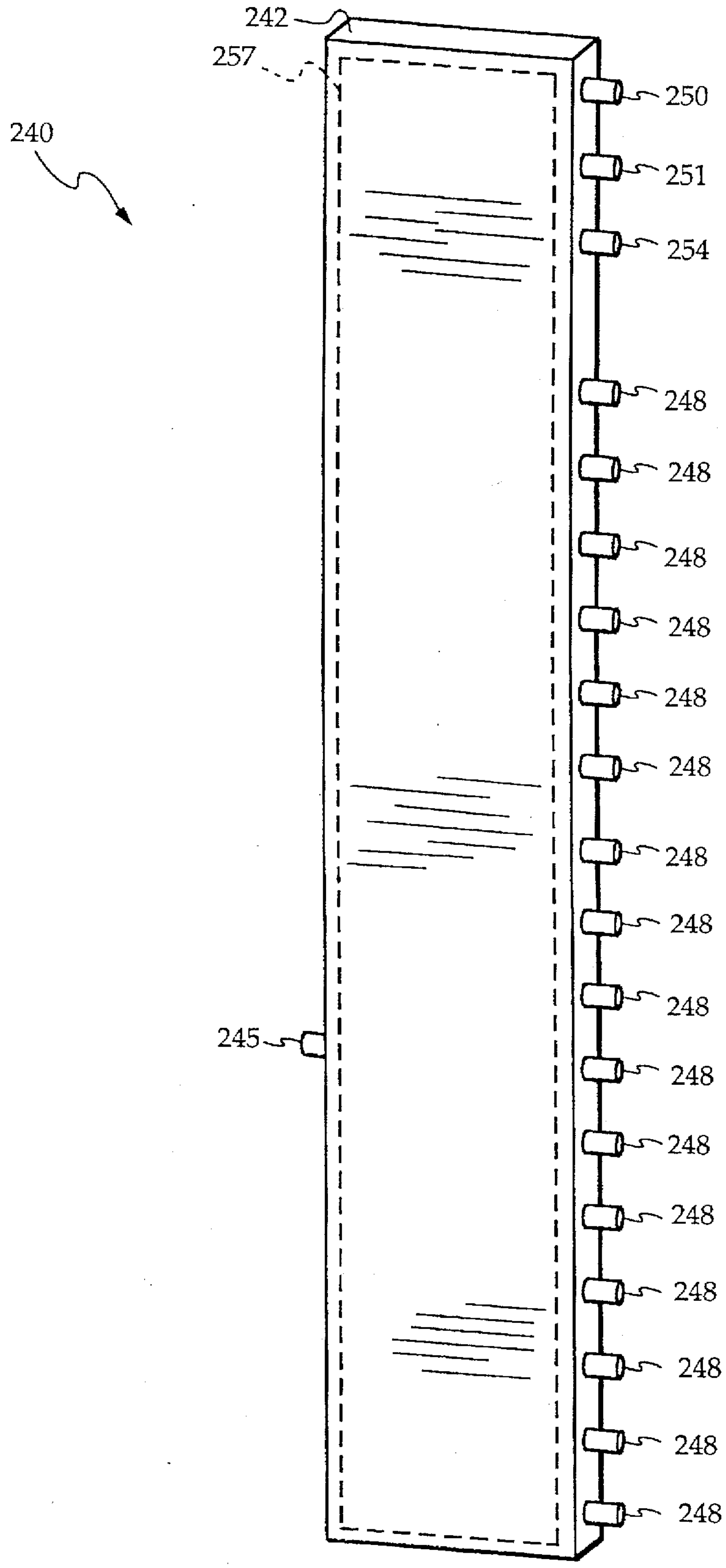
FIG. 4 is a perspective view of a second switching module of the modular interconnect matrix of FIGS. 1A and 1B.

Referring again to FIGS. 1A and 1B, a plurality (Y) of second switching modules 240 are also provided for interconnection with the signal splitter modules 205. Referring also to FIG. 4, the second switching module 240 comprises a generally rectangular shaped housing 242. Mounted on one of the long (major axis) sides of the housing 242 is a first connector 245, and mounted on the other long (major axis) side of the housing is a plurality (N) of second connectors 248, a ground connector 250, a power connector 251 and a control connector 254. Located within the second switching module housing 242 is an electronic switch 257 which is interconnected to all of the connectors 245, 248, 250, 251, 254 mounted on the second switching module 240. The electronic switch 257 is a one-pole-N-throw switch which interconnects the first connector 245 to any one of the second connectors 248 under control of control signals provided via the control connector 254, as will be described in greater detail hereinafter. The electronic switch 257 may be a one-pole-sixteen-throw electronic switch SW9480 manufactured by the Celwave Division of Radio Frequency Systems, Inc., which is powered by a 15 VDC power supply and is controlled by a pulse width modulated data stream containing both timing (clock) data and control (switching) data.

Referring again to FIGS. 1A and 1B, the first connector 245 (FIG. 4) on each of the second switching modules 140 is connected to a corresponding RF scanning receiver 260. Associated with each RF scanning receiver 260 is a phase locked loop (PLL) device 263 and a micro-controller 267, e.g., a HC11F1 (PLL) manufactured by Motorola. As will be described in greater detail hereinafter, the micro-controller 267 controls the phase locked loop 263, which in turn controls the receiving frequency of the RF scanning receiver so as to sequentially receive RF signals at selected frequencies associated with certain ones of the radio channel units 203, and the micro-controller 267 also controls the second switching module 240 to sequentially interconnect the RF scanning receiver 260 with the antennas 202 via the splitters 205. The RF scanning receiver 260 then determines which antennas 202 have the strongest signal strength at the operating frequencies of the selected radio channel units 203, and provides an indication thereof to the micro-controller 267. The micro-controller 267 then controls the first switching modules 217 of the selected radio channel units 203 to interconnect with the two antennas 202 having the strongest signal strength.

Referring again to FIGS. 2, 4 and 5, as with the first switching modules 217, all of the second connectors 248 on the second switching modules 240 are female coaxial quick disconnect connectors 239 of the type illustrated in FIG. 7. Additionally, as with the first switching modules 217, the second connectors 248 on the second switching module 240 are arranged such that when placed perpendicular to the rows of second connectors 215 on the signal splitter module 205, the second connectors 248, 215 interconnect with one another.

The operation of the radio signal receive modular interconnect matrix 200 is best understood by example. Referring to FIGS. 1A and 1B, fifteen (15) first switching modules 217 are provided for connection to fifteen (15) corresponding radio channel units 203. The radio channel units 203 and first switching modules 217 are divided into groups of equal numbers, and each group is associated with a corresponding second switching module 240, RF scanning receiver 260, micro-controller 267 and phrase locked loop 263. In the example of FIGS. 1A and 1B, the first switching modules 217 and radio channel units 203 are divided into five groups of three. Therefore, there are five second switching modules 240, RF scanning receivers 260, phase locked loops 263 and micro-controllers 267.

There are 16 signal splitter modules 205, one being associated with each antenna 202. Each of the signal splitter modules 205 comprises twenty second connectors 215. On each of the signal splitter modules 205, fifteen of the second connectors are provided for interconnection with the fifteen first switching modules 217, and the remaining five second connectors 215 on the signal splitter module 205 are provided for interconnection with the five second switching modules 240. The interconnection of the signal splitter modules 205, first switching modules 217 and second switching modules 240 is illustrated in FIG. 5. The signal splitter modules 205 are arranged adjacent to each other with the two rows of second connectors 215 on each signal splitter module 205 arranged parallel to the rows of second connectors 215 on the other signal splitter modules 205. Ten of the first switching modules 217 are arranged adjacent to one another with their rows of second connectors 225 parallel to one another and perpendicular to the rows of second connectors 215 on the signal splitter modules 205. The male and female coaxial quick disconnect connectors 238, 239 (FIGS. 6 and 7) are then interconnected with one another such that at least one of the second connectors 225 on each of the ten first switching modules 217 is interconnected with at least one of the second connectors 215 on each of the sixteen signal splitter modules 205. The remaining five first switching modules 217 and the five second switching modules 240 are arranged in a like manner on an opposite side of the sixteen adjacent signal splitter modules 205.

Using the above described modular interconnect matrix, various relationships are established based on the following parameters:

N=the number of antennas.

M=the number of radio channel units.

Y=the number of groups the radio channel units are arranged in.

The relationships established by the above recited parameters include:

The number of signal splitter modules=N

The number of first switching modules=M

The number of second switching modules=Y

The number of second connectors on the first and second switching modules=N

The number of second connectors on the signal splitter modules=X=(M+Y)

Each micro-controller 267 controls a corresponding phase locked loop 263, second switching module 240 and three first switching modules 217 in each one of the five groups. Each radio channel unit 203 transmits and receives RF signals on an assigned (operating) frequency, and the phase locked loop 263 is configured to control the receiving frequency of the RF scanning receiver for sequentially receiving RF signals at three different frequencies, each of the three frequencies corresponding to the operating frequencies of the three radio channel units in its corresponding group. Under control of the micro-controller 267, the second switching module 240 selects one of the sixteen antennas 202. The signals provided by the antenna 202 are provided via the band pass filter 208 to the adjustable amplifier 210 where the received signals are amplified. Next the received signal is provided to the corresponding signal splitter module 205 where the signal is divided into 20 equal parts. One of the equal parts is provided to each of the second switching modules 240.

A control signal is provided on a line 270 from the micro-controller 267 to the control terminal 254 (FIG. 4) of the second switching module 240 for controlling the position of the one-pole-sixteen-throw switch 257 (FIG. 4) of the second switching module 240 for antenna selection. The part of the amplified RF signal from the selected antenna is provided via the first connector 245 (FIG. 4) of the second switching module 240 to a line 272 which is connected to the RF scanning receiver 260. The micro-controller also provides control signals on a line 275 to the phase locked loop 263 once an antenna has been selected to control the phase locked loop to in turn control the receiving frequency of RF scanning receiver 260 so as to sequentially receive RF signals at the three different frequencies corresponding to the three radio channel units within the corresponding group. Control signals are provided by the phase locked loop to the RF scanning receiver 260 on a line 278. First, the RF scanning receiver 260 measures the power level of the RF signal on the line 272 at the first frequency under control of the phase locked loop. The RF scanning receiver provides a signal on a line 280 to the micro-controller 267 indicative of the power level of the signal on the line 272 at the first frequency. The micro-controller 267 then provides a control signal on the line 275 to the phase locked loop 263, which in turn controls the RF scanning receiver 260 to receive RF signals at the second frequency. The RF scanning receiver then provides a second measurement of the power level of the received signal at the second excitation frequency on the line 280 to the micro-controller 267. This procedure is repeated for the third frequency.

After measurements are taken on one antenna at the three different excitation frequencies, the micro-controller provides a control signal on the line 270 to the second switching module 240 for selection of the next antenna 202. The signal provided by the next antenna 202 is then measured at the three excitation frequencies and these measurements are recorded by the micro-controller 267. This procedure is repeated for all sixteen antennas 202. Each antenna 202 is sampled at all three frequencies approximately 8 times per second. The micro-controller 267 maintains a running average of the received signal strength at the three radio channel unit operating frequencies for all sixteen antennas, and provides a control signal on a line 285 to each of the first switching modules 217 in the corresponding group indicative of the two antennas having the strongest signal strength at the operating frequency of the corresponding radio channel unit. The electronic two-pole-16-throw switch 230 (FIG. 3) in the first switching module 217 connects two of the second connectors 225 (FIG. 3) to the two first connectors 222 (FIG. 3) in response to the control signal on the line 285 from the micro-controller 267. As is known in the art, the radio channel unit diversity amplifier then selects between the two input signals for providing an input to the receiver.

Since the antennas 202 are directional antennas, the micro-controller controls the second switching module 240 to sample the antennas 202 so that adjacent antennas are not consecutively sampled, but rather, antennas from different direction quadrants are sampled consecutively. For example, if the antennas are sequentially numbered 116, the antennas may be sampled in the following order: 1, 4, 7, 10, 13, 16, 3, 6, 9, 12, 15, 2, 5, 8, 11, 14.

The invention has been described thus far with respect to a radio signal receive modular interconnect matrix. However, the invention is also applicable to a radio signal transmit modular interconnect matrix, e.g., a modular interconnect matrix used to interconnect a plurality of radio channel units with a plurality of antennas for the transmission of signals provided by the radio channel units via the antennas.

Figure 8:
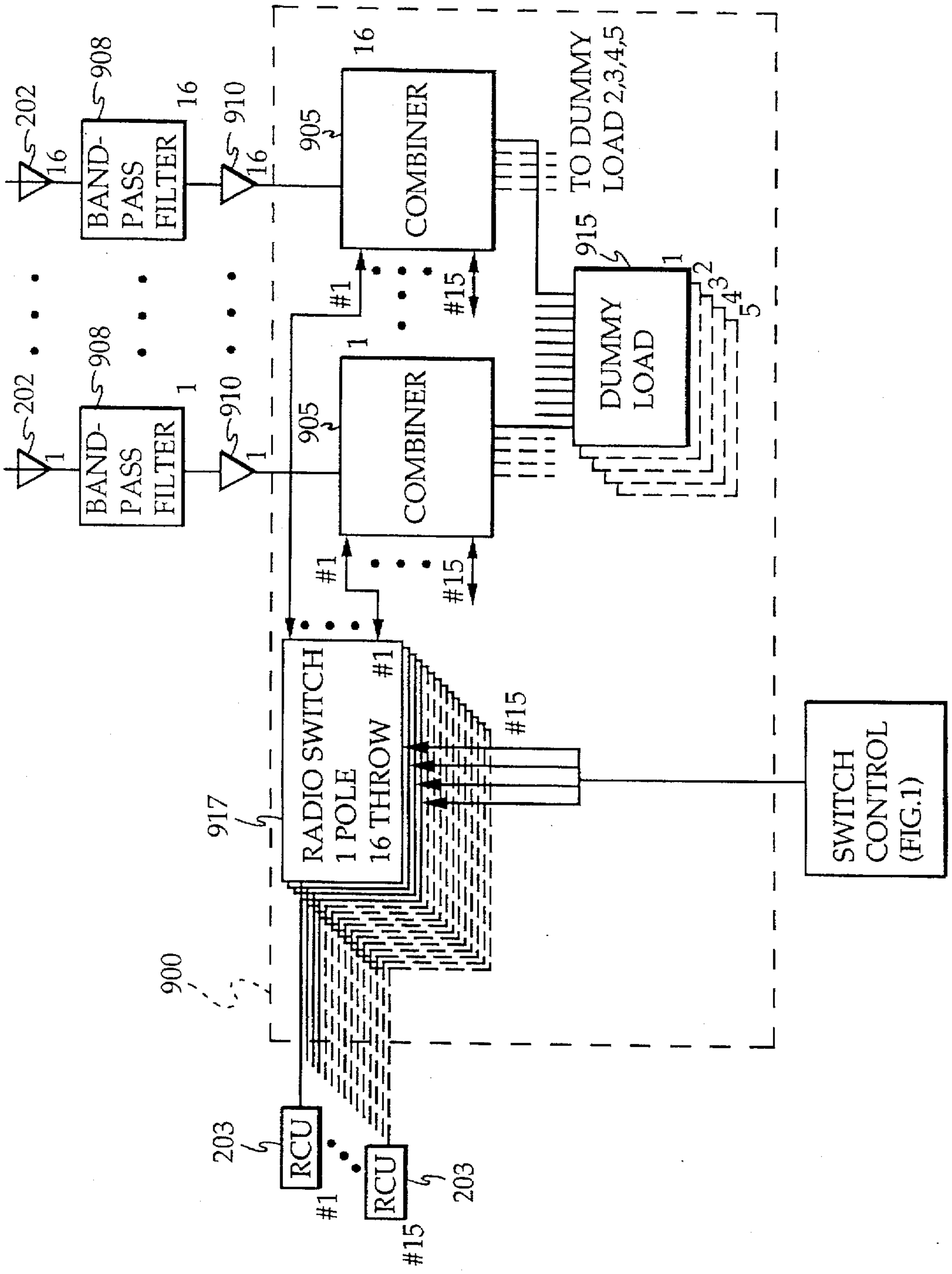
FIG. 8 is a schematic block diagram of a modular interconnect matrix used for transmitting RF signals.

Referring to FIG. 8, a transmit modular interconnect matrix 900 is similar to the receive modular interconnect matrix 200 (FIGS. 1A and 1B) except that the first switching module 917 is provided with one first connector for interconnection to a transmit terminal of a radio channel unit 203. Additionally, the signal splitter modules 205 (FIGS. 1A and 1B) are replaced with combiner modules 905 which combine RF signals provided to its plurality of second connectors into a combined RF signal which is provided from the first connector via an amplifier 910 and filter 908 to an antenna 202 for transmission. It is assumed that the antenna 202 indicated as having the strongest received signal strength at the operating frequency of the radio channel unit is the best antenna for transmission of signals provided by the radio channel unit, and therefore, a second switching module and corresponding scanning receiver phase locked loop and micro-controller are not required in the transmit matrix interconnect module 900. Instead, each first switching module of the transmit matrix interconnect module is controlled to interconnect its first connector with its second connector corresponding with the antenna having the strongest signal strength at the operating frequency of the corresponding radio channel unit. Additionally, since the five second switching modules are not required in the transmit modular interconnect matrix 900, the combiner modules 905 may be configured for connection with five dummy loads 915 mounted to the five second connectors which are not used. Alternatively, each combiner module 905 may be provided with only 15 second connectors for interconnection with the 15 first switching modules.

Figure 9:
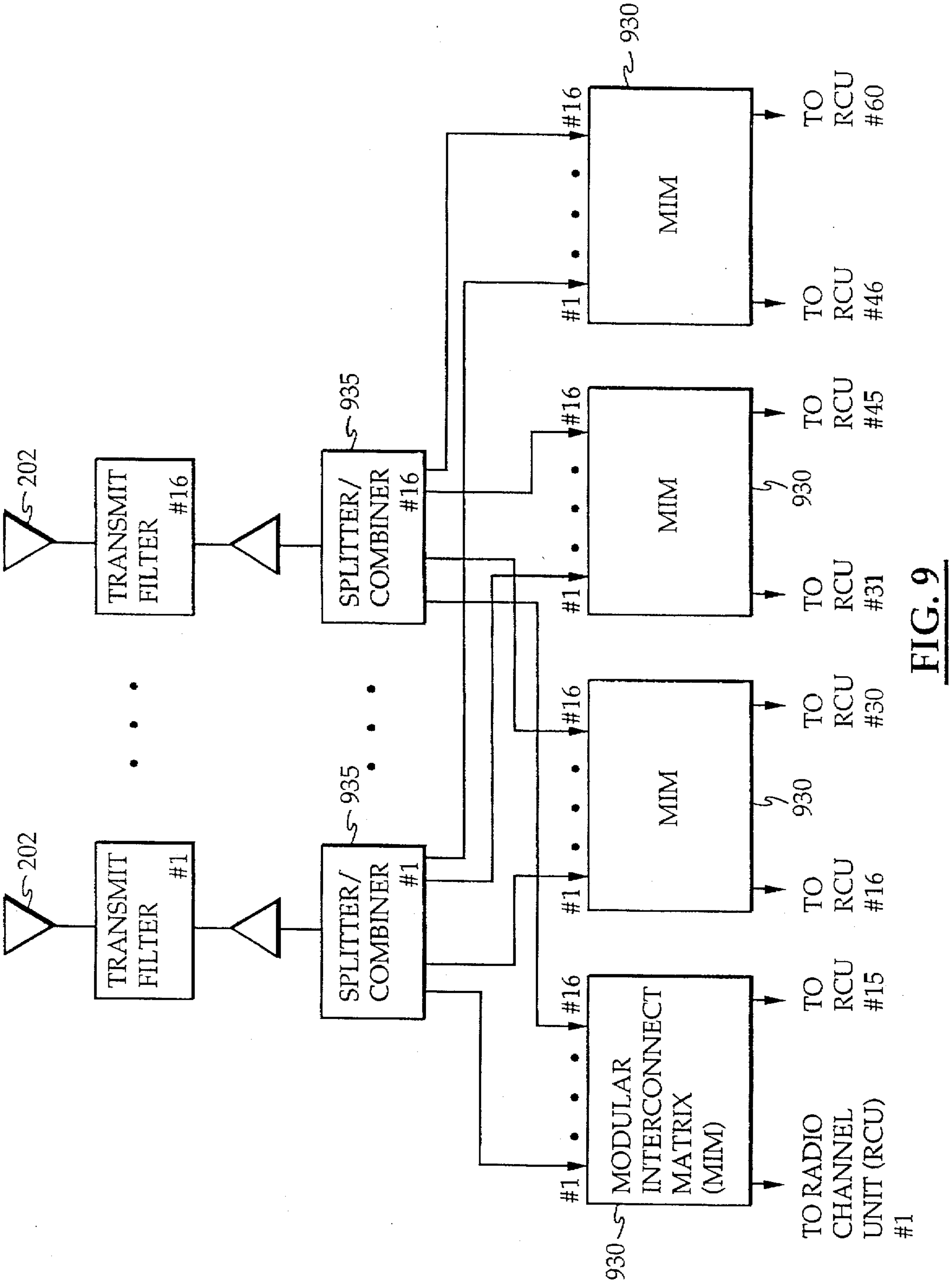
FIG. 9 is a schematic block diagram of a first alternative embodiment of the modular interconnect matrix of FIGS. 1A and 1B.
Figure 10:
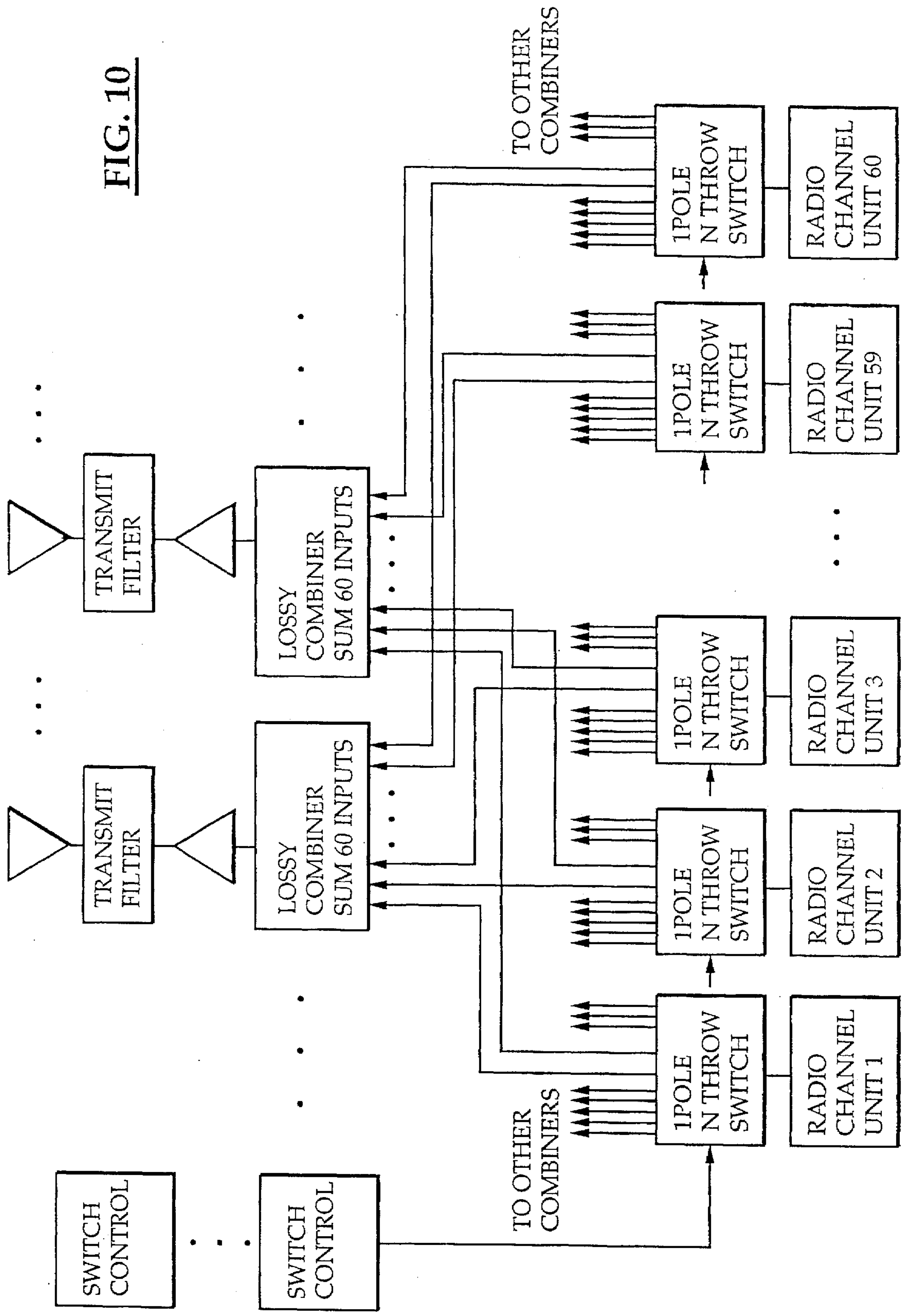
FIG. 10 is a schematic block diagram of a second alternative embodiment of the modular interconnect matrix of FIGS. 1A and 1B.

The invention has been described thus far for interconnecting 15 radio channel units with the 16 antennas. If it is desired to increase the number of radio channel units or the number of antennas, the modular components may be modified accordingly. Alternatively, a plurality of modular interconnect matrices may be provided to increase the number of radio channel units. For example, referring to FIG. 9, four modular interconnect matrices 930 may be provided, each for interconnection to 15 radio channel units and sixteen antennas 202. Each of the modular interconnect matrices 930 may be connected to the antennas 202 via a second combiner or splitter 935 for achieving the desired total number of radio channel units and antennas. As shown in FIG. 10, there are four modular interconnect matrices 930 each having 15 radio channel units for a total of 60 radio channel units interconnected to 16 antennas.

The invention has been described herein as using modules which directly interconnect with one another for providing the matrix connection of any one of a plurality of antennas with any one of a plurality of radio channel units. However, in another embodiment of the invention, rather than providing interconnecting modules for creating the matrix, the components of the matrix connection may be interconnected with known coaxial cables. An example of such a matrix connection (transmit matrix) using coaxial cables is schematically illustrated in FIG. 10. In a RF signal transmit interconnection having 60 switches associated with 60 radio channel units with 16 antennas via 16 combiners, 960 coaxial cables are required between the combiners and the switches. Similarly, 960 coaxial cables are required between 60 switches and 16 splitters for RF signals received by the 16 antennas. Although this embodiments provides the desired matrix connection of the radio channel units and the antennas, the physical mass of cabling and the cost of connectors, cable, and cable assembly and inspection is significant.

Although the invention has been described herein with respect to exemplary embodiments thereof, it will be understood by those skilled in the art that the foregoing and various other changes, omissions and additions may be made therein and thereto without department from the spirit and scope of the present invention.

What is claimed is:

1. A modular interconnect matrix for matrix connection of a first plurality of antennas with a second plurality of radio channel units, wherein the antennas and the radio channel units transmit and receive RF signals at assigned operating frequencies, comprising:

a third plurality of first switching modules, each having a housing-with at least one first switching connector and a plurality of second switching connectors mounted thereon, each first switching module being connected by its first switching connector to a corresponding radio channel unit;

first switching means in the housing of each one of said first switching modules for connecting each one of said first switching connectors with any one of said second switching connectors;

a fourth plurality of antenna interface modules, each having a housing with a first interface connector and a plurality of second interface connectors mounted thereon, each antenna interface module being connected by its first interface connector to a corresponding antenna;

wherein said second switching connectors are dimensioned for interconnection with said second interface connectors; and wherein said second switching connectors and said second interface connectors are arranged on the respective first switching module housings and antenna interface module housings such that when the antenna interface module housings are arranged in side-by-side relation with respect to one another, each of said second switching connectors on each of said first switching module housings is arranged for direct engagement with at least one of said second interface connectors on each of said antenna interface module housings.

2. A modular interconnect matrix according to claim 1 further comprising at least one switch control means for controlling said first switching means.

3. A modular interconnect matrix according to claim 2, wherein each of said first switching connectors on said first switching modules are connected to a receive terminal on said corresponding one of the radio channel units.

4. A modular interconnect matrix according to claim 3, wherein said antenna interface modules are signal splitter modules each of which divides an RF signal received at its first interface connector from said corresponding antenna into a plurality of divided RF signals each having an equal signal strength which is a fraction of the signal strength of said RF signal, said divided RF signals being provided to said second interface connectors.

5. A modular interconnect matrix according to claim 4, wherein said switch control means interconnects said first switching connector with one of said second switching connectors on each of said first switching modules such that said receive terminal on said corresponding one of the radio channel units is interconnected with the antenna having the strongest signal strength of the received RF signals at the operating frequency of said corresponding one of the radio channel units.

6. A modular interconnect matrix according to claim 2, wherein each of said first switching connectors on said first switching modules are connected to a transmit terminal on said corresponding one of the radio channel units.

7. A modular interconnect matrix according to claim 6, wherein said antenna interface modules are signal combiner modules each of which combines RF signals received at its second interface connectors from said transmit terminals into a combined RF signal which is provided to said first interface connector for transmission by said corresponding antenna.

8. A modular interconnect matrix according to claim 7 wherein said switch control means interconnects said first switching connector with one of said second switching connectors on each of said first switching modules such that said transmit terminal on said corresponding one of the radio channel units is interconnected with the antenna having the strongest signal strength of the received RF signals at the operating frequency of said corresponding one of the radio channel units.

9. A modular interconnect matrix according to claim 2, wherein the radio channel units each comprise a diversity receiver having two receive terminals for receiving RF signals, and wherein each of said first switching modules has two first switching connectors which are connected to a corresponding one of said receive terminals on said corresponding one of the radio channel units.

10. A modular interconnect matrix according to claim 9, wherein said antenna interface modules are signal splitter modules each of which divides an RF signal received at its first interface connector from said corresponding antenna into a plurality of divided RF signals each having an equal signal strength which is a fraction of the signal strength of said RF signal, said divided RF signals being provided to said second interface connectors.

11. A modular interconnect matrix according to claim 10, wherein said switch control means interconnects said first switching connectors with two of said second switching connectors on each of said first switching modules such that one of said receive terminals on said corresponding one of the radio channel units is interconnected with the antenna having the strongest signal strength of the received RF signals at the operating frequency of said corresponding one of the radio channel units and another of said receive terminals on said corresponding one of the radio channel units is interconnected with the antenna having the second strongest signal strength of the received RF signals at the operating frequency of said corresponding one of the radio channel units.

12. A modular interconnect matrix according to claim 2, wherein each said switch control means comprises:

a second switching module having a housing with a first control connector and a plurality of second control connectors mounted thereon, said second control connectors being dimensioned for interconnection with said second interface connectors, and said second control connectors and said second interface connectors being arranged on the respective second switching module housing and antenna interface module housings such that when the antenna interface module housings are arranged in side-by-side relation with respect to one another, each of said second control connectors on said second switching module housing is arranged for direct engagement with at least one of said second interface connectors on each of said antenna interface module housings;

second switching means in the housing of said second switching module for connecting each first control connector with any one of said second control connectors;

frequency control means for sequentially providing frequency control signals each indicative of the operating frequencies of the radio channel units;

scanning receiver means connected to said first control connector on said second switching module housing, said scanning receiver means being responsive to said frequency control signals and to RF signals provided by said antenna interface modules for providing signal strength signals indicative of the signal strength of said RF signals at the operating frequencies of the radio channel units; and a controller responsive to said signal strength signals for determining the antenna having the strongest signal strength of the received RF signals at the operating frequency of each radio channel unit, said controller providing control signals to said first switching means for interconnecting each first switching connector with one of said second switching connectors such that each radio channel unit is connected with the antenna indicated as having the strongest signal strength of the received RF signals at the operating frequency of the radio channel unit.

13. A modular interconnect matrix according to claim 12 comprising a plurality of said switch control means each assigned to one group of a plurality of groups and wherein:

each radio channel unit is assigned to a corresponding one of said groups;

each frequency control means sequentially provides frequency control signals to a corresponding one of said scanning receiver mean in said corresponding one of said groups at the operating frequencies of the radio channel units in said corresponding one of said groups; and each controller provides said control signals to said first switching means which are connected to radio channel units in said corresponding one of said groups.

14. A modular interconnect matrix according to claim 13 wherein each controller provides second control signals to said second switching means of a corresponding second switching module for interconnecting said first control connector to each one of said second control connectors of said corresponding second switching module in a predetermined sequence.

15. A modular interconnect matrix according to claim 14 wherein, between each second control signal in said predetermined sequence, each controller controls a corresponding frequency control means to sequentially provide said frequency control signals to said corresponding one of said scanning receiver means, said frequency control signals corresponding to the operating frequency of each radio channel unit in said corresponding one of said groups.

16. A modular interconnect matrix according to claim 15, wherein each of said first switching connectors on said first switching modules are connected to a receive terminal on said corresponding one of the radio channel units, and wherein said antenna interface modules are signal splitter modules each of which divides an RF signal received at its first interface connector from said corresponding antenna into a plurality of divided RF signals each having an equal signal strength which is a fraction of the signal strength of said RF signal, said divided RF signals being provided to said second interface connectors.

17. A modular interconnect matrix according to claim 15, wherein each of said first switching connectors on said first switching modules are connected to a transmit terminal on said corresponding one of the radio channel unit, and wherein each antenna interface module includes a signal combiner module which combines RF signals received at its second interface connectors from said transmit terminals into a combined RF signal which is provided to said first interface connector for transmission by said corresponding antenna and also include a signal splitter module which divides an RF signal received at its first interface connector from said corresponding antenna into a plurality of divided RF signals each having an equal signal strength which is a fraction of the signal strength of said RF signal, said divided RF signals being provided to said second interface connectors, said second interface connectors on said signal splitter modules being connected to said second control connectors

18. A modular interconnect matrix according to claim 15 wherein the radio channel units each comprise a diversity receiver having two receive terminals for receiving RF signals, wherein each of said first switching modules has two first switching connectors which are connected to a corresponding one of said receive terminals on said corresponding one of the radio channel units, wherein said antenna interface modules are signal splitter modules each of which divides an RF signal received at its first interface connector from said corresponding antenna into a plurality of divided RF signals each having an equal signal strength which is a fraction of the signal strength of said RF signal, said divided RF signals being provided to said second interface connectors, and wherein said controllers provide control signals to said first switching means in each of said first switching modules for interconnecting said first switching connectors with two of said second switching connectors such that one of said receive terminals on said corresponding one of the radio channel units is interconnected with the antenna having the strongest signal strength of the received RF signals at the operating frequency of said corresponding one of the radio channel-units and another of said receive terminals on said corresponding one of the radio channel units is interconnected with the antenna having the second strongest signal strength of the received RF signals at the operating frequency of said corresponding one of the radio channel units.

* * * * *

UNITED STATES PATENT AND TRADEMARK OFFICE

CERTIFICATE OF CORRECTION

PATENT NO. : 5,752,200
DATED : May 12, 1998
INVENTOR(S) : Meredith et al.

It is certified that error appears in the above-identified patent and that said Letters Patent is hereby corrected as shown below:

At column 10, lines 40 and 41, change "each having a housing-with" to --each having a housing with--.

At column 12, line 53, change "switch control means" to --switch control means,--.

At column 12, line 54, change "plurality of groups" to --plurality of groups.--.

At column 12, line 59, change "scanning receiver mean" to --scanning receiver means--.

At column 14, line 6, change "connectors" to --connectors.--.

UNITED STATES PATENT AND TRADEMARK OFFICE

CERTIFICATE OF CORRECTION

PATENT NO. : 5,752,200

DATED : May 12, 1998

INVENTOR(S) : Meredith, et. al.

It is certified that error appears in the above-indentified patent and that said Letters Patent is hereby corrected as shown below:

At column 14, line 28, change "radio channel-units" to --radio channel units--.

Signed and Sealed this

Twenty-eighth Day of July, 1998

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,752,200
DATED : May 12, 1998
INVENTOR(S) : Meredith et al.

It is certified that error appears in the above-identified patent and that said Letters Patent is hereby corrected as shown below:

Column 6,
Line 51, please delete "switching modules 140" and insert -- switching modules 240 --.

Signed and Sealed this

Sixth Day of November, 2001

*Attest:*

Nicholas P. Godici

NICHOLAS P. GODICI

*Attesting Officer*

*Acting Director of the United States Patent and Trademark Office*